US008670512B1

United States Patent
Wang

(10) Patent No.: US 8,670,512 B1
(45) Date of Patent: Mar. 11, 2014

(54) ACCELERATION OF PHASE AND FREQUENCY TRACKING FOR LOW-LATENCY TIMING RECOVERY

(75) Inventor: Nanyan Wang, Coquitlam (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 0 days.

(21) Appl. No.: 13/540,962

(22) Filed: Jul. 3, 2012

(51) Int. Cl.
*H04L 7/00* (2006.01)

(52) U.S. Cl.
USPC ........... 375/371; 375/316; 375/354; 375/357; 375/362; 375/373; 375/375

(58) Field of Classification Search
USPC .......... 375/316, 371, 354, 357, 362, 373, 375
See application file for complete search history.

(56) References Cited

U.S. PATENT DOCUMENTS

| 6,236,343 | B1 | 5/2001 | Patapoutian | |
|---|---|---|---|---|
| 7,634,040 | B1 * | 12/2009 | Yang et al. | 375/376 |
| 7,885,030 | B2 | 2/2011 | Eleftheriou | |
| 7,916,822 | B2 | 3/2011 | Aziz | |
| 2006/0056564 | A1 * | 3/2006 | Takeuchi | 375/376 |
| 2007/0036253 | A1 * | 2/2007 | Seo et al. | 375/354 |

OTHER PUBLICATIONS

Spagna, "An Improved Delay Compensation Technique for Digital Clock Recovery Loops", The 8th IEEE International Conference on Electronics, Circuits and Systems, 2001, vol. 3, pp. 1395-1398.

\* cited by examiner

*Primary Examiner* — Siu Lee
(74) *Attorney, Agent, or Firm* — Dennis R. Haszko

(57) ABSTRACT

Circuit and methods accelerate jitter tracking and reduce or eliminate the processing delay of loop filtering in timing recovery. A timing recovery circuit incorporates a phase tracking accelerator and a frequency tracking accelerator to compute the phase and frequency variation of incoming signal during the delay period of a loop filter. In one embodiment, phase and frequency tracking accelerators are realized in direct forms. In another embodiment, pre-computed lookup tables are employed in phase and frequency tracking accelerators to ease timing closure and simplify accelerator circuit. The phase tracking accelerator and the frequency tracking accelerator together compensate the estimated phase at the output of a loop filter and eliminate the processing delay of loop filtering. The loop bandwidth and jitter tolerance of timing recovery are increased.

37 Claims, 9 Drawing Sheets

ACCELERATION OF PHASE AND FREQUENCY TRACKING FOR LOW-LATENCY TIMING RECOVERY

FIELD

The present disclosure relates generally to timing recovery. More particularly, the present disclosure relates to timing recovery, or clock recovery, in a digital phase locked loop.

BACKGROUND

In a high-speed serializer/deserialzer (SerDes), data is sent without a common clock between transmitter and receiver. In the presence of jitter, both the phase and the frequency of an analog-digital converter (ADC) sampling clock at a near-end receiver deviate from a reference clock. Timing recovery, also known as clock recovery, is used in clock and data recovery (CDR) to track the phase and frequency of an incoming signal and provide either timing or clock for data recovery.

It is well known that timing recovery suffers from the latency of the timing recovery loop. In synchronous timing recovery, or alternatively, a digital phase-locked loop (PLL), the phase and frequency of an ADC sampling clock are adjusted to lock to the phase of the incoming signal. In asynchronous timing recovery, the recovered phase is used to extract the transmitted symbol from an oversampled incoming signal. In both cases, the recovered phase lags behind the phase and frequency variations of the incoming signal. This delay causes intrinsic jitter of the timing recovery circuit. Most importantly, it has significant impact on the performance of CDR which must meet a jitter tolerance (JTOL) mask.

A JTOL mask specifies the minimum jitter amplitude at frequencies of interest that a CDR needs to tolerate. The corner frequency on the JTOL mask specifies the minimum bandwidth of timing recovery loop which determines the minimum jitter frequency that a timing recovery circuit needs to track. An increase of loop latency decreases the phase margin and stability region of timing recovery loop and, accordingly, reduces loop bandwidth and JTOL.

FIG. 1 illustrates the amplitude response of a jitter transfer function (JTF). Large latency of the timing recovery loop leads to narrow loop bandwidth. Accordingly, the maximum jitter frequency that a timing recovery circuit can track is reduced.

FIG. 2 illustrates the impact of loop latency on jitter tolerance. As shown in FIG. 2, large loop latency leads to small jitter attenuation at low jitter frequencies and excessive amplification at high frequencies and, thus, degrades JTOL. The loop latency affects not only the performance of timing recovery, but also the cost and power consumption of a device.

Given the latency budget of a timing recovery loop, it is not feasible to insert additional delay stages into critical paths to ease timing closure. Low-speed cells with less leakage power are replaced with high-speed cells in order to meet the set-up and hold time of flip-flops. The resulting device can be less power-efficient and less cost-effective.

In modern multi-GHz SerDes, complex control and arithmetic logic are widely used in loop filters. Additional delay stages are inserted in a loop filter in order to meet the setup and hold time of flip-flops. The processing delay of loop filtering accounts for a significant portion of the overall latency of a timing recovery loop. A known simplified second-order digital loop filter with additional delay stages is depicted in FIG. 3.

FIG. 3 illustrates a digital loop filter 10 with additional pipeline delay stages. The filter 10 in FIG. 3 comprises a proportional control path 20 with additional a delay stages 22, an integral control path 30 with additional c delay stages 32, and a phase computation block 40 with additional b delay stages 42. The proportional control path 20 scales the phase error, i.e., e(k), detected by a phase error detector, with proportional gain Gp. It tracks the phase variation of the incoming signal.

A first integrator 34 in the integral control path 30 tracks the frequency of the incoming signal based on a received integral control gain $G_i$. The outputs of the proportional control path and the integral path are combined to form a phase correction signal. A second integrator 44 in the phase computation block 40 is used in computing the recovered phase θ(k) which is used to either adjust a near-end sampling clock or control the timing of data recovery.

As can be seen in FIG. 3, the recovered phase θ(k) at the output of the phase computation block 40 lags behind the detected phase error e(k). The corresponding processing delays of phase tracking and frequency tracking are (a+b) and (c+b) clock cycles, respectively.

It is desirable to reduce or eliminate the processing delay of loop filtering and accelerate the tracking of phase and frequency variations.

BRIEF DESCRIPTION OF THE DRAWINGS

Embodiments of the present disclosure will now be described, by way of example only, with reference to the attached Figures.

DETAILED DESCRIPTION

Figure 1:
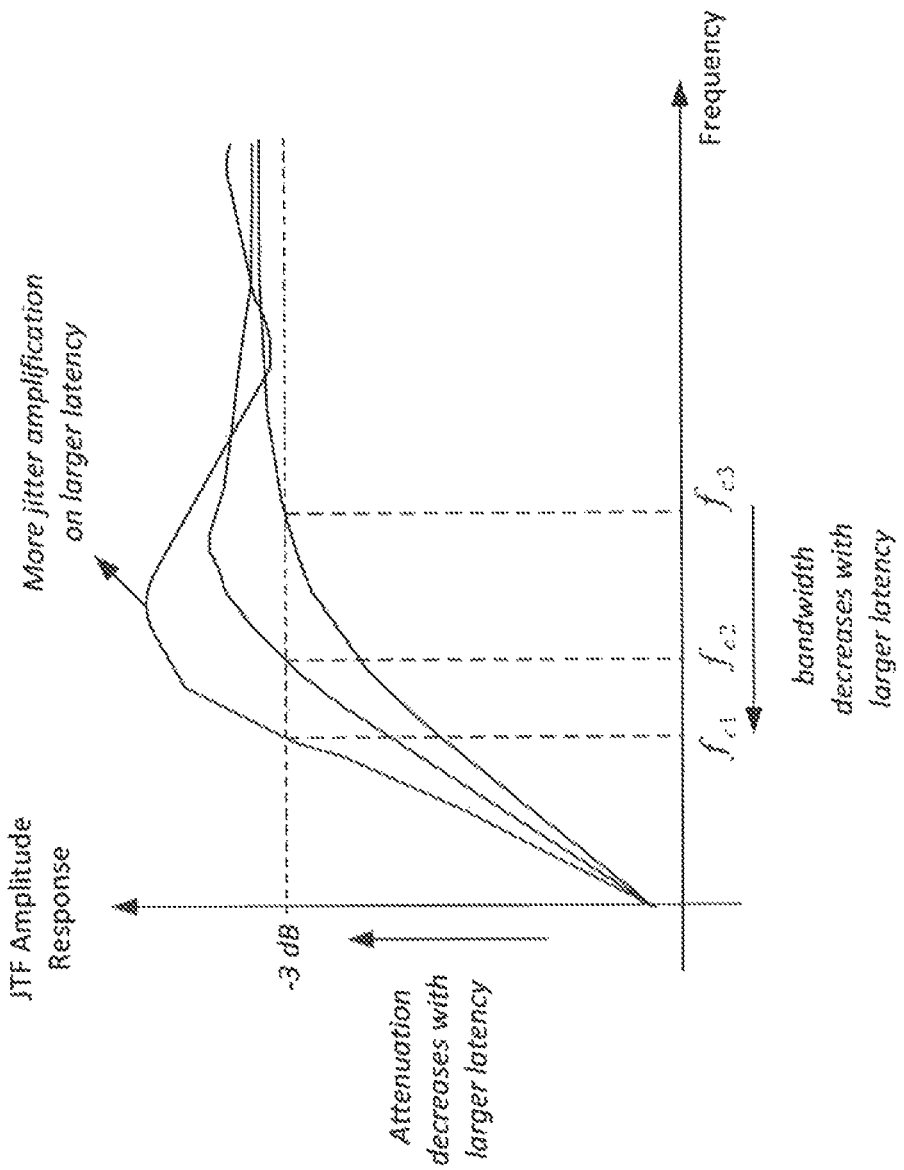
FIG. 1 illustrates an amplitude response of jitter transfer function.
Figure 2:
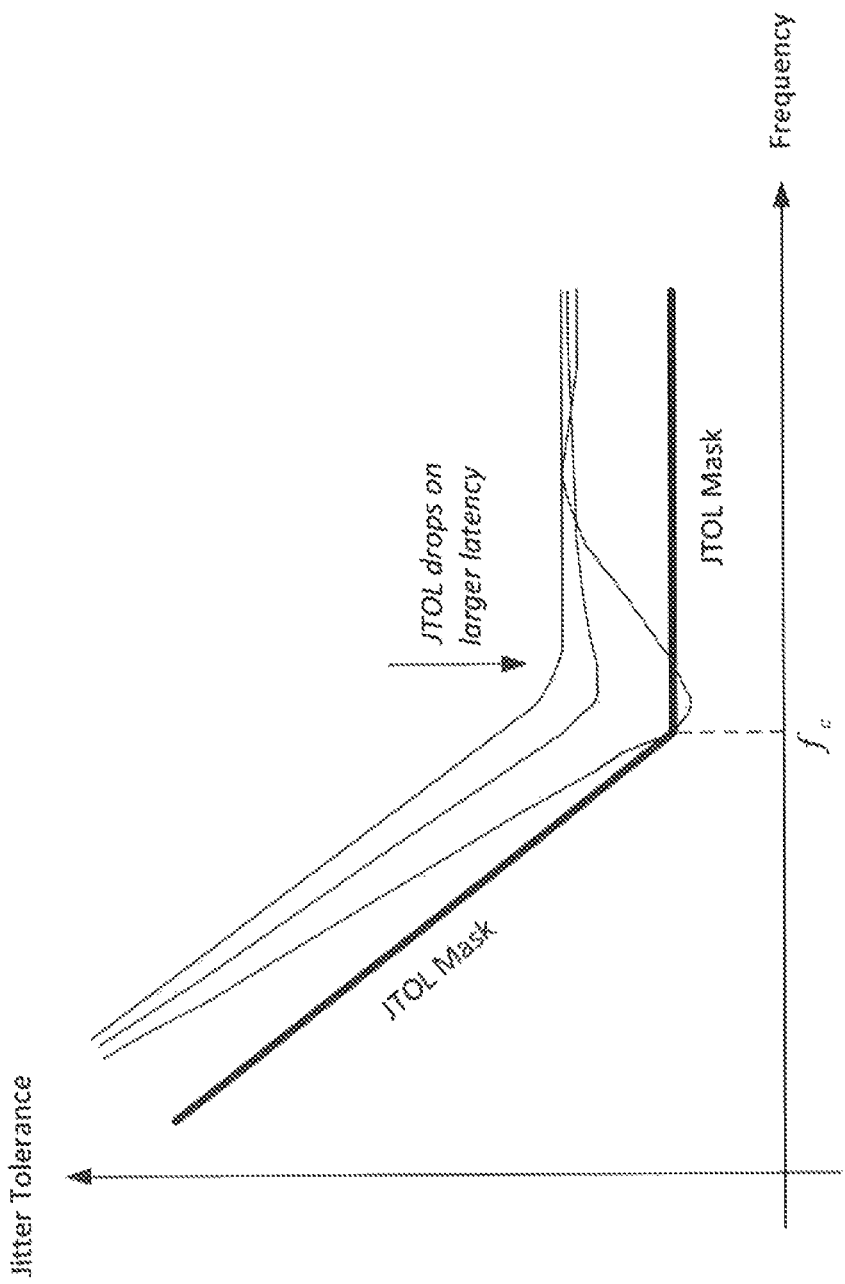
FIG. 2 illustrates the impact of loop latency on jitter tolerance.

Generally, the present disclosure provides a circuit and methods that accelerate jitter tracking and reduce or eliminate the processing delay of loop filtering in timing recovery. A timing recovery circuit incorporates a phase tracking accelerator and a frequency tracking accelerator to compute the phase and frequency variation of an incoming signal during the delay period of a loop filter. In one embodiment, phase and frequency tracking accelerators are realized in direct forms. In another embodiment, pre-computed look-up tables are employed in phase and frequency tracking accelerators to ease timing closure and simplify the accelerator circuits. The phase tracking accelerator and the frequency tracking accelerator together compensate the estimated phase at the output of a loop filter and eliminate the processing delay of loop filtering. The loop bandwidth and jitter tolerance of timing recovery are increased.

In an embodiment, the present disclosure provides a timing recovery circuit for use in a timing recovery loop. The circuit includes: a loop filter; a frequency tracking accelerator configured to compute a phase estimate error due to frequency tracking delay; and a phase tracking accelerator configured to compute phase variations based on a combined delay period of the loop filter and of the accelerators. The timing recovery circuit is configured to compute a recovered phase using outputs of the frequency tracking accelerator and the phase tracking accelerator.

In an example embodiment, the phase tracking accelerator includes: a delay-based phase tracking accelerator circuit configured to compute accumulated phase variations $A_{p1}(k)$ during a combined delay period of the loop filters and the accelerators; and a frequency-based phase tracking accelerator circuit configured to compute accumulated phase variations $A_{p2}(k)$ based on an estimated frequency offset during the combined delay period of loop filtering and accelerating.

In an example embodiment in which the loop filter includes a phase error detector and an integral control path: the input of the delay-based phase tracking accelerator circuit is coupled to the output e(k) of the phase error detector; the input of the frequency-based phase tracking accelerator is coupled to the output f(k) of the integral control path of the loop filter; and the input of the frequency tracking accelerator is coupled to the output e(k) of the phase error detector. The timing recovery circuit can further include: a first adder having a first input coupled to the output $A_{p1}(k)$ of the delay-based phase tracking accelerator circuit $A_{p1}(k)$ and a second input coupled to the output $A_{p2}(k)$ of the frequency-based phase tracking accelerator circuit, configured to compute the combined output $A_p(k)$ of the phase tracking accelerator; a plurality d of delay stages configured to delay the estimated phase θ(k) at the output of the phase computation block, where d represents the number of additional delay stages in the phase and frequency tracking accelerators; and a second adder configured to compute the recovered phase for timing recovery, wherein a first input of the second adder is coupled to the delayed phase estimate θ(k−d), a second input of the second adder is coupled to the combined output of the phase tracking accelerator $A_p(k)$, and a third input of the second adder is coupled to the output of the frequency tracking accelerator $A_f(k)$.

The timing recovery circuit of claim 4 wherein the loop filter comprises a proportional control path, and wherein the delay-based phase tracking accelerator circuit further comprises a first multiplier having a first input coupled to the output e(k) of the phase error detector and having a second input coupled to a proportional control gain $G_p$ of the proportional control path in the loop filter.

In an example embodiment, the delay-based phase tracking accelerator circuit comprises a plurality (a+b+d−1) of cascaded delay-add segments, wherein a is the number of pipeline delay stages in the proportional control path of the loop filter, b is the number of pipeline delay stages in a phase computation block of the loop filter, and d is the cumulative number of additional pipeline delay stages in the phase tracking accelerator and the frequency tracking accelerator. In an example embodiment, each of the plurality (a+b+d−1) of cascaded delay-add segments has a first input being delayed and then summed with a second input. The plurality of cascaded delay-add segments can include: a first delay-add segment having both a first input and a second input coupled to the output of the first multiplier; and subsequent delay-add segments having a first input coupled to the output of the preceding delay-add segment and a second input coupled to the output of the first multiplier.

In an example embodiment, the frequency-based phase tracking accelerator circuit comprises a plurality (b−2) of cascaded delay-add segments. In an example embodiment, each delay-add segment has a first input being delayed and then summed with a second input. In an example embodiment, the plurality of cascaded delay-add segments comprises: a first delay-add segment having both a first input and a second input coupled to the output f(k) of the loop filter integral control path f(k); and subsequent delay-add segments having a first input coupled to the output of the preceding delay-add segment and a second input coupled to the output f(k) of the loop filter integral control path.

In an example embodiment, the frequency-based phase tracking accelerator circuit comprises a second multiplier having a first input coupled to the output f(k) of the loop filter integral control path and a second input coupled to a constant signal (a+d+1), wherein a is the number of pipeline delay stages in the proportional control path of the loop filter and d is the number of additional pipeline delay stages in the accelerator.

In an example embodiment, the frequency-based phase tracking accelerator circuit comprises a third adder having a first input coupled to the delayed signal of the second multiplier output, and a second input coupled to the delayed signal of the output of the last delay-add segment of the plurality of cascaded delay-add segments. The frequency-based phase tracking accelerator circuit can comprise (d−1) delay stages having an input coupled to the output of the third adder to compute the output $A_{p2}(k)$ of the frequency-based phase tracking accelerator circuit.

In an example embodiment, the phase tracking accelerator comprises a fourth adder having a first input coupled to the output $A_{p1}(k)$ of the last delay-add segment of the plurality of delay-add segments, and having a second input coupled to the output $A_{p2}(k)$ of the frequency-based phase tracking accelerator to compute the phase tracking accelerator output.

In an example embodiment, the frequency tracking accelerator comprises (a+d) parallel multipliers, (a+d−1) cascaded delay-add segments, and (c−a) delay stages where c is the number of pipeline delay stages in the integral control path of the loop filter.

In an example embodiment, an m-th multiplier in the (a+d) parallel multipliers in the frequency tracking accelerator has a first input coupled to the output e(k) of the phase error detector, and has a second input coupled to a constant signal (a+d+1−m)$G_i$, for m=1, 2, ..., a+d. In another example embodiment, an m-th multiplier in the (a+d) parallel multipliers in the frequency tracking accelerator has a first input coupled to the output e(k) of the phase error detector, and has a second input coupled to a constant signal (a+d+1−m)$G_i$, for m=1, 2, ..., a+d; and: the plurality (a+d−1) of cascaded delay-add segments in the frequency tracking accelerator comprises a first segment and an m-th segment; the first segment has a first input and a second input coupled to the output of the first multiplier and the output of the second multiplier, respectively; the m-th segment has a first input coupled to the output the preceding delay-add segment and a second input coupled to the output of the (m+1)th multiplier; and the frequency tracking accelerator comprises (c−a) delay stages having an input coupled to the output of the last segment of the (a+d−1) cascaded delay-add segments.

In an example embodiment, the timing recovery circuit further comprises: a first pre-computed lookup table (LUT)

stored in a computer readable medium for phase tracking acceleration, the pre-computed LUT having N outputs, where N represents the number of possible values of the detected phase error e(k); and a first pre-computation multiplexer (MUX) in communication with the pre-computed LUT to receive the N outputs of the pre-computed LUT as inputs to the pre-computation MUX, the output of the pre-computation MUX being provided as an input to the phase tracking accelerator.

In an example embodiment, the timing recovery circuit further includes: a first pre-computed lookup table (LUT) stored in a computer readable medium for phase tracking acceleration, the first pre-computed LUT having N outputs, where N represents the number of possible values of the detected phase error e(k); and a first pre-computation multiplexer (MUX) in communication with the first pre-computed LUT and configured to receive the N outputs of the first pre-computed LUT as inputs to the first pre-computation MUX, the output of the first pre-computation MUX being provided as an input to the phase tracking accelerator. A second input of the delay-based phase tracking accelerator circuit is coupled to the output f(k) of the integral control path of the loop filter, and subsequent N inputs are coupled to the output $Q_0, Q_1, \ldots, Q_{N-1}$ of the first pre-computed LUT. The first pre-computed LUT has (a+d) by N pre-computed outputs $F_1^0, F_1^1, \ldots, F_1^{N-1}, F_2^0, F_2^1, \ldots, F_{a+d}^0, F_{a+d}^1, \ldots, F_{a+d}^{N-1}$ stored in the computer readable medium for the acceleration of frequency tracking.

In an example embodiment, an nth pre-computed value in the first pre-computed LUT for the phase tracking accelerator is $Q_n = G_p e_n$ for $n=0, 1, \ldots, N-1$, where $e_n$ is the nth possible value of phase error, e(k).

In an example embodiment, the delay-based phase tracking accelerator comprises a N-to-1 multiplexer (MUX) having a MUX selection signal coupled to the phase error e(k) at a phase error detector output, and N inputs coupled to the N outputs from the first pre-computed LUT to select one pre-computed signal $Q_s$.

In an example embodiment, the delay-based phase tracking accelerator comprises a plurality (a+b+d−1) of cascaded delay-add segments, wherein a is the number of pipeline delay stages in the proportional control path of the loop filter, b is the number of pipeline delay stages in a phase computation block of the loop filter, and d is the cumulative number of additional pipeline delay stages in the phase tracking accelerator and the frequency tracking accelerator.

In an example embodiment, each of the plurality (a+h+d−1) of cascaded delay-add segments has a first input being delayed and then summed with a second input.

In an example embodiment, the plurality of cascaded delay-add segments comprises: a first delay-add segment having both a first input and a second input coupled to the output of the first pre-computation MUX; and second and subsequent delay-add segments having a first input coupled to the output of the preceding delay-add segment and a second input coupled to the output of the first pre-computation MUX.

In an example embodiment, the phase tracking accelerator comprises an adder having a first input coupled to the output of the last delay-add segment $A_{p1}(k)$ and a second input coupled to the output of the frequency-based phase tracking accelerator $A_{p2}(k)$ to compute the pre-computation-based phase tracking accelerator output $A_p(k)$.

In an example embodiment, the timing recovery circuit further comprises: a second pre-computed lookup table (LUT) stored in a computer readable medium for phase tracking acceleration; and an array of second pre-computation multiplexers (MUXs) in communication with the second pre-computed LUT to receive the outputs of the second pre-computed LUT as inputs to the second pre-computation MUXs, the output of each of the second pre-computation MUXs being provided as inputs to delay-add segments in the frequency tracking accelerator.

In an example embodiment, the second pre-computed LUT has (a+d) by N outputs, where N represents the number of possible values of the detected phase error e(k), a is the number of pipeline delay stages in the proportional control path of the loop filter, and d is the number of additional pipeline delay stages in the accelerator; and the array of second pre-computation MUXs comprises (a+d) second pre-computation MUXs to receive the (a+d) by N outputs of the second pre-computed LUT as inputs to the pre-computation MUXs such that each of the second pre-computation multiplexers has N inputs.

In an example embodiment, the second pre-computed LUT comprises (a+d) by N entries, resulting in $F_m^n = (a+d-m)G_i e_n$, for $n=0, 1, \ldots, N-1$, and $m=1, 2, \ldots, a+d$.

In an example embodiment, the frequency tracking accelerator comprises (a+d) parallel N-to-1 MUXs having the selection signal of each MUX coupled to the phase error e(k) from the phase error detector. In another example embodiment, the inputs of the m-th MUX of the frequency tracking accelerator select one output signal $F_m^s$ from N outputs $F_m^0$, $F_m^1, F_m^{N-1}$ of the second pre-computed LUT.

In an example embodiment, the frequency tracking accelerator comprises (a+d−1) cascaded delay-add segments and (c−a) delay stages.

In an example embodiment, the first segment of (a+d−1) cascaded delay-add segments in the frequency tracking accelerator has a first input coupled to the output of the first MUX output $F_1^s$ and a second input coupled to the output of the second MUX output $F_2^s$.

In an example embodiment, the m-th segment, for $m=2, 3, \ldots, a+d$, of the (a+d−1) cascaded delay-add segments in the frequency tracking accelerator has the first input coupled to the output of the preceding delay-add segment and a second input coupled to the output of the (m+1)th MUX output $F_{m+1}^s$.

In an example embodiment, the frequency tracking accelerator comprises (c−a) delay stages having the input coupled to the output of the last segment of the (a+d−1) cascaded delay-add segments.

In another embodiment, the present disclosure provides a timing recovery method for a timing recovery loop, including: computing a phase estimate error due to frequency tracking delay; computing accumulated delay-based phase variations based on a combined delay period of the loop filter and of the accelerators; computing accumulated frequency-based phase variations based on an estimated frequency offset in a combined delay period of the loop filter and of the accelerators; and computing a recovered phase based on the computed phase estimate error, the delay-based accumulated phase variations, and the frequency-based phase variations.

In an example embodiment, the method further includes: providing a first pre-computed look-up table (LUT) for the acceleration of phase tracking; providing a pre-computation-based phase tracking accelerator to accelerate the tracking of phase variation during the loop delay period of a timing recovery loop; providing a second pre-computed look-up table (LUT) for the acceleration of frequency tracking; and providing a pre-computation-based frequency tracking accelerator to accelerate the tracking of frequency variation during the loop delay period of a timing recovery loop.

Other aspects and features of the present disclosure will become apparent to those ordinarily skilled in the art upon review of the following description of specific embodiments in conjunction with the accompanying figures.

Embodiments of the present disclosure relate to the acceleration of phase and frequency tracking in timing recovery. In an example embodiment, the key target characteristic is a timing recovery loop or a digital PLL employing a digital loop filter.

Embodiments of the present disclosure describe circuits and methods for accelerating the tracking of phase and frequency jitters, and reducing or eliminating the processing delay of loop filtering in timing recovery. The embodiments improve loop bandwidth and jitter tolerance, or enable cost-effective and power-efficient integrated circuit design, or both.

Current state of the art of latency reduction in timing recovery is represented by the following public domain publications each of which is, incorporated by reference in its entirety.

Hybrid timing recovery for loop latency reduction is disclosed in U.S. Pat. No. 7,916,822 to Pervez et al. The frequency tracking path and phase tracking path of a traditional loop filter are separated and placed in two tracking loops: a frequency tracking loop based on voltage controlled oscillator (VCO) and a phase tracking loop based on clock phase selection.

A number of techniques have been disclosed to mitigate the impact of loop latency on timing recovery by compensating the phase error. In U.S. Pat. No. 6,236,343 to Ara, a conventional loop filter of a PLL is augmented by two internal feedback paths. The states of the integral path and the estimated phase in a loop filter are fed back to the input of a loop filter to compensate the detected phase error from phase error detector.

In U.S. Pat. No. 7,885,030 to Evangelos et al., the detected phase error at the input of a loop filter is compensated by using a correction term which is derived from the current phase and frequency estimates generated by a PLL circuit.

A latency-compensated PLL is reported in *An Improved Delay Compensation Technique for Digital Clock Recovery Loops*, by Fulvio, The 8th IEEE International Conference on Electronics, Circuits and Systems, vol. 3, pp. 1395-1398, 2001. The delayed phase adjustment at VCO output is used to form a feedback signal to compensate the detected phase error. However, jitter tracking error due to the phase variation of incoming signal, or equivalently, the far-end transmitter clock, during loop delay period cannot be compensated.

In U.S. Pat. No. 7,634,040 to Meng-Ta et al., a latency compensator is inserted between the phase error detector and the loop filter in a PLL loop. While the intrinsic jitter of timing recovery and overshot of loop response to phase variation are reduced, phase correction delay is unchanged and may increase due to the insertion of latency compensator in the critical path of a timing recovery loop.

Embodiments of the present disclosure provide an integral part of a timing recovery loop. The existing art compensates the detected phase error at the input of a loop filter. In contrast, according to embodiments of the present disclosure, phase and frequency tracking accelerators are inserted in a timing recovery loop to accelerate jitter tracking and compensate the estimated phase at loop filter output.

The approaches disclosed in embodiments described herein are advantageous in that they can reduce or eliminate the processing delay of loop filtering. Accordingly, they increase loop bandwidth and expand the frequency range of jitter tracking. Most importantly, the JTOL of a CDR can be substantially improved. In addition, the disclosed embodiments enable insertion of additional pipeline delay stages in the critical paths of a loop filter without increasing the overall latency of a timing recovery loop. This eases timing closure and enables design optimization for less area and power rather than timing closure.

In example embodiments described in detail below, both the phase tracking accelerator and the frequency tracking accelerator are derived based on the assumption of a classic second order loop filter. In other example embodiments, the phase tracking accelerator and the frequency tracking accelerator are derived based on loop filters of arbitrary order, with the necessary variations being obvious to one of ordinary skill in the art. Hence, the description of example embodiments is not intended to be limiting in any way.

Figure 3:
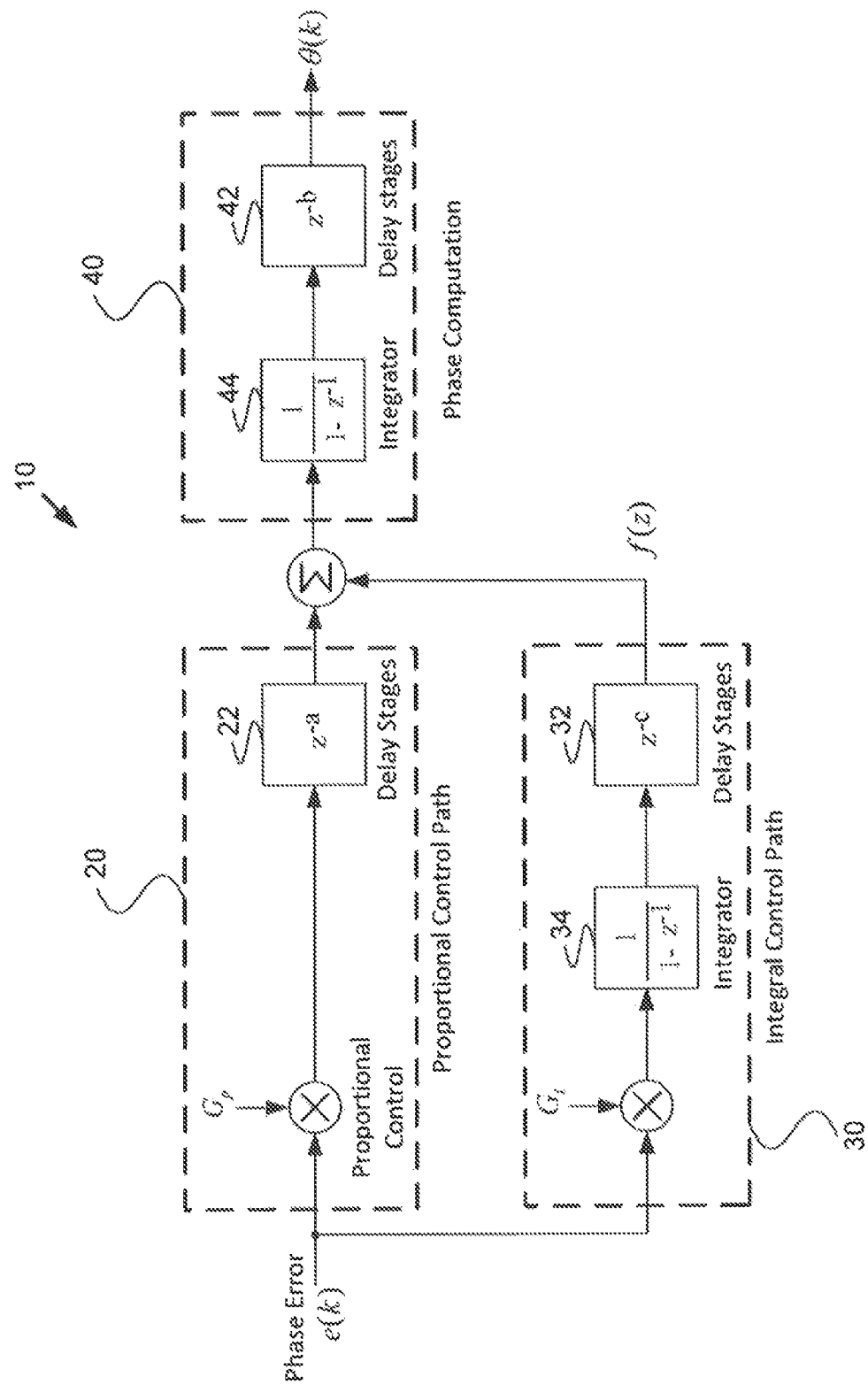
FIG. 3 illustrates a digital loop filter with additional pipeline delay stages.
Figure 4:
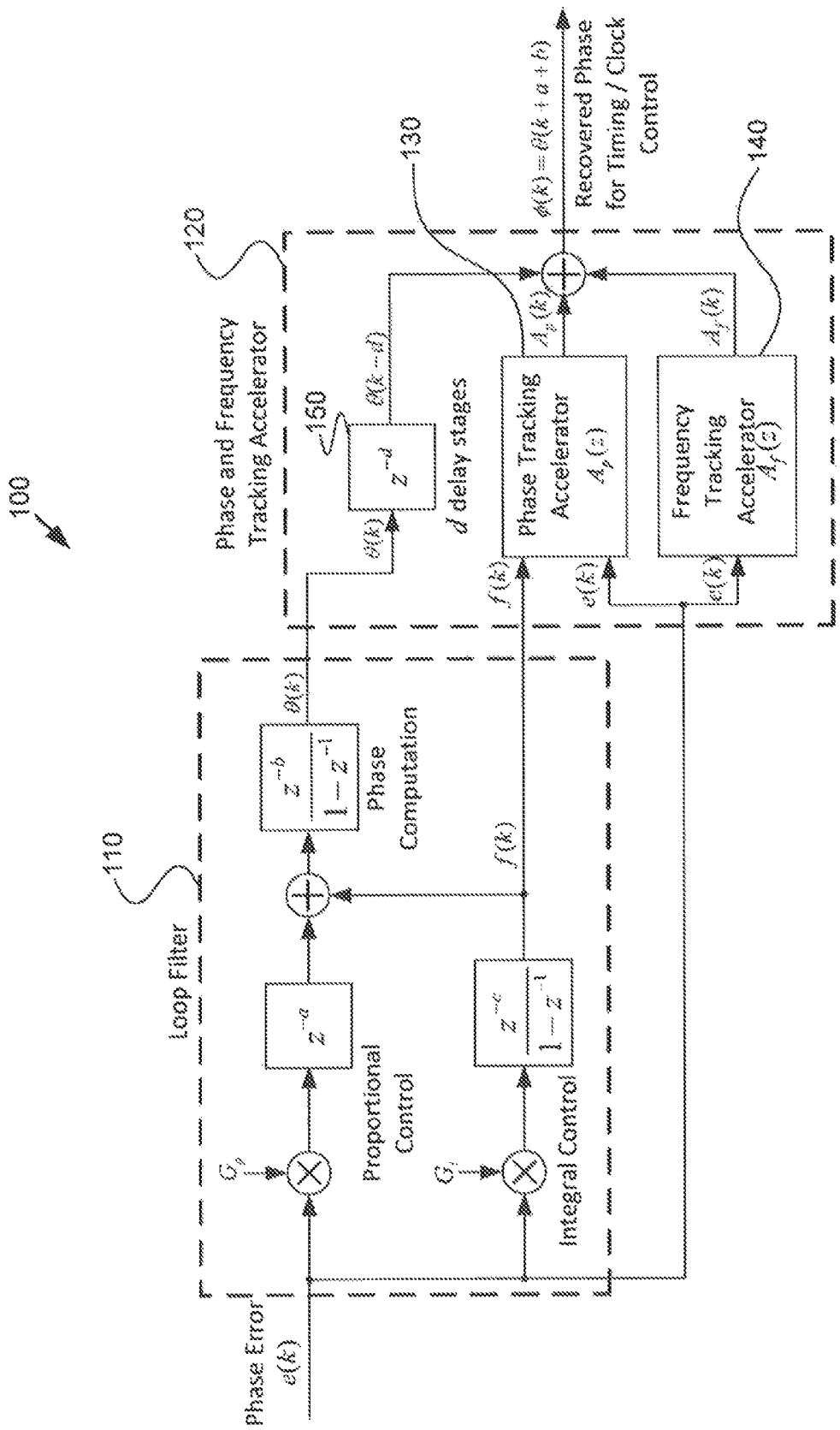
FIG. 4 illustrates a timing recovery circuit including phase and frequency tracking accelerator according to an embodiment of the present disclosure.

FIG. 4 illustrates an example embodiment of a timing recovery circuit 100 including a classic second-order loop filter that incorporates a phase tracking accelerator and a frequency tracking accelerator. The loop filter portion 110 incorporates elements similar to the digital loop filter 10 of FIG. 3. The phase and frequency tracking accelerator 120 comprises a phase tracking accelerator 130 and a frequency tracking accelerator 140. The phase tracking accelerator 130 is configured to compute phase variations based on a combined delay period of the loop filter and of the accelerators. The frequency tracking accelerator 140 is configured to compute a phase estimate error due to frequency tracking delay. The timing recovery circuit 100, which includes a plurality d of delay stages 150, is configured to compute a recovered phase using outputs of the phase tracking accelerator 130 and the frequency tracking accelerator 140.

The two accelerators 130 and 140 accelerate the tracking of phase and frequency jitters and reduce or eliminate the processing delay of loop filtering, i.e., $$\phi(k)=\theta(k+a+b) \qquad (1)$$

where k is the discrete time index. The equivalent z domain representation after acceleration is $$\phi(z)=\theta(z)z^{a+b} \qquad (2)$$

where θ(z) is the z-domain representation of θ(k) given by $$\theta(z) = f(z)\frac{z^{-b}}{1-z^{-1}} + e(z)G_p\frac{z^{-(a+b)}}{1-z^{-1}} \qquad (3)$$

In general, in the loop filter 110, the number of pipeline delay stages in the proportional control path is either equal or less than the number of pipeline delay stages in the integral control path, i.e., a≤c. If a=c, the processing delay of loop filtering can be completely eliminated after acceleration. If a<c, zero phase tacking delay is achieved and the latency of frequency tracking is reduced by (a+b) delay units after acceleration.

The inputs to the phase and frequency tracking accelerator 120 include the estimated frequency offset f(k) which is the output of the integral control path in the loop filter, the phase error e(k) from the output of a phase error detector, and the phase estimate θ(k) at the output of the phase computation block.

In a high-speed synchronous circuit, additional pipeline stages may be provided in an accelerator to meet the set-up and hold time requirements of flip-flops. Without loss of generality, assume that there are d pipeline delay stages from accelerator input θ(k) to accelerator output φ(d), then accelerator output φ(z) in Equation (2) can be rewritten as $$\phi(z)=\theta(z)z^{a+b}=[\theta(z)z^{a+b+d}]z^{-d} \qquad (4)$$

It can be derived from Equation (3) that $$\theta(z)z^{a+b+d} = \theta(z) + \Sigma_{n=1}^{a+b+d} f(z)z^{a+d} + \Sigma_{n=1}^{a+b+d} G_p e(z)z^d \quad (5)$$

Upon substitution of Equation (5) into Equation (4), it follows that $$\phi(z) = \theta(z)z^{-d} + z^{-d}\Sigma_{n=0}^{a+d} f(z)z^{-n} + \Sigma_{n=1+d}^{b+d-1} f(z)z^{-n} + \Sigma_{n=0}^{a+b+d-1} G_p e(z)z^{-n} \quad (6)$$

Starting from $$f(z) = G_i \, e(z)\frac{z^{-c}}{1-z^{-1}} \quad (7)$$

it can be derived that $$z^{-d}\Sigma_{n=0}^{a+d} f(z)z^{-n} = (a+d+1)f(z)z^{-d} + \Sigma_{n=c-a}^{c+d-1}(a-c+n+1)G_i e(z)z^{-n} \quad (8)$$

By substituting Equation (8) into Equation (6), Equation (6) can be rewritten as $$\phi(z) = \theta(z)z^{-d} + A_p(z) + A_f(z) \quad (9)$$

where $$A_f(z) = z^{-(c-a)}\Sigma_{n=0}^{a+d-1}(n+1)G_i e(z)z^{-n} \quad (10)$$

$A_f(z)$ is the z-domain representation of the frequency tracking accelerator 140.

$A_p(z)$ is the z-domain representation of the phase tracking accelerator 130 which comprises two components, i.e., $$A_p(z) = A_{p1}(z) + A_{p2}(z) \quad (11)$$

The two phase tracking components $A_{p1}(z)$ and $A_{p2}(Z)$ are given by:

$$A_{p1}(z) = G_p\Sigma_{n=0}^{a+b+d-1} e(z)z^{-n} \quad (12)$$

and $$A_{p2}(z) = [(a+d+1)f(z) + (z)z^{-n-1}]z^{-d} \quad (13)$$

respectively.

A time-domain representation of the recovered phase of the incoming signal after phase and frequency tracking acceleration at discrete time k is given by $$\phi(k) = \theta(k-d) + A_p(k) + A_f(k) \quad (14)$$

where $\theta(k-d)$ is the recovered phase $\theta(k)$ delayed by d delay stages 150, $A_p(k)$ is the output of the phase tracking accelerator 130, and $A_f(k)$ is the output of the frequency tracking accelerator 140.

Figure 5:
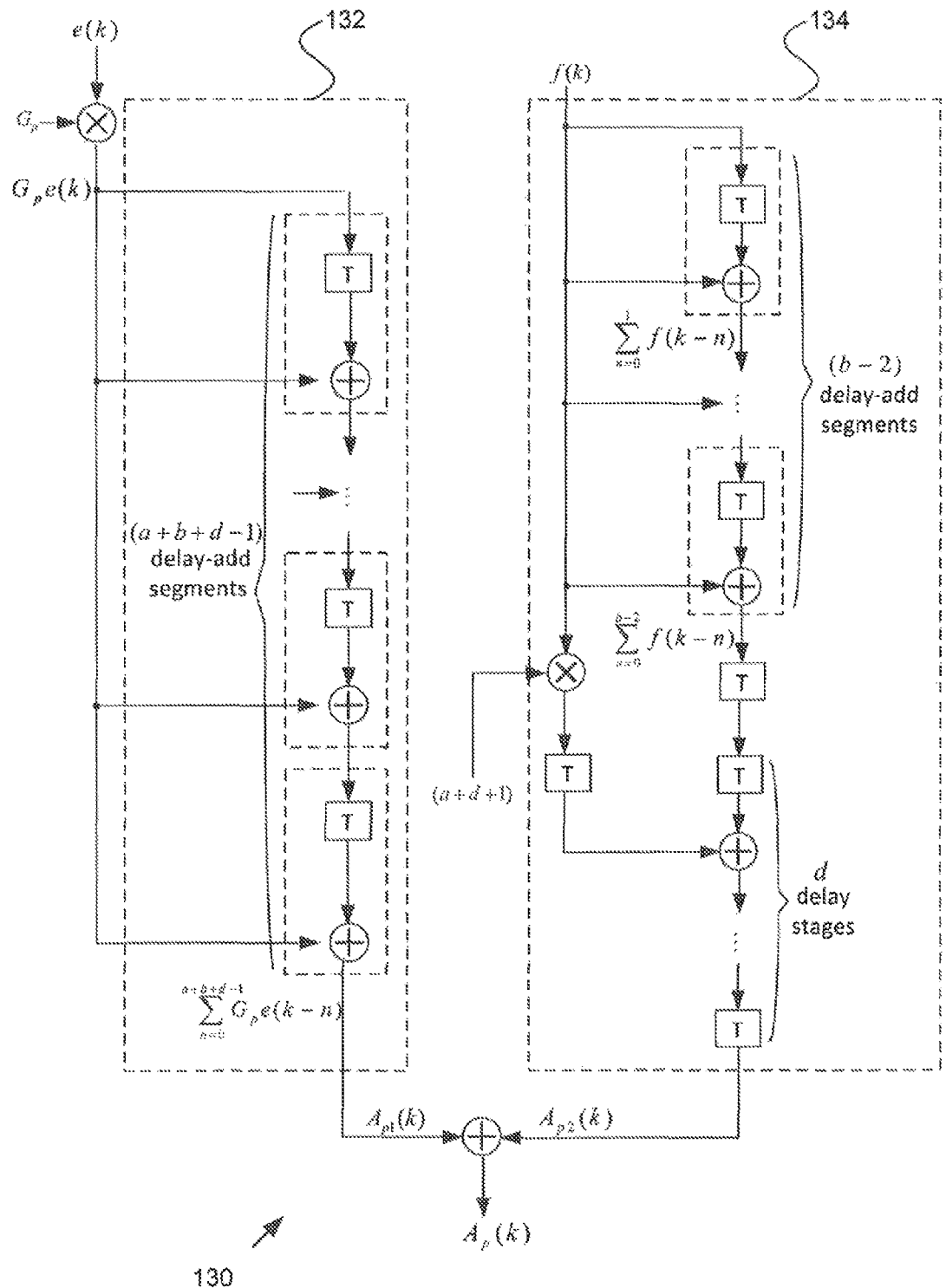
FIG. 5 illustrates a direct-form phase tracking accelerator according to an embodiment of the present disclosure.

In an embodiment, to be described in further detail in relation to FIG. 5, a time-domain representation of the phase tracking accelerator 130 is given by $$A_p(k) = A_{p1}(k) + A_{p2}(k) \quad (15)$$

wherein a delay-based phase tracking accelerator circuit characterized by $$A_{p1}(k) = G_p\Sigma_{n=0}^{a+b+d-1} e(k-n) \quad (16)$$

accumulates phase variations during the combined delay period of loop filtering and accelerating, and a frequency-based phase tracking accelerator circuit characterized by $$A_{p2}(k) = (a+d+1)f(k-d) + \Sigma_{n=1+d}^{b+d-1} f(k-n) \quad (17)$$

accumulates phase variation based on the estimated frequency offset during the combined delay period of loop filtering and accelerating.

A time-domain representation of the frequency tracking accelerator 140 is given by $$A_f(k) = G_i\Sigma_{n=0}^{a+d-1}(n+1)e(k-n-c+a) \quad (18)$$

which computes the phase estimate error due to frequency tracking delay.

Direct-Form Phase and Frequency Tracking Accelerator

An example embodiment of a direct-form phase tracking accelerator 130 is illustrated in FIG. 5. The direct-form phase tracking accelerator 130 comprises two components to accelerate the tracking of phase jitter. A first component, or delay-based phase tracking accelerator circuit 132, computes $A_{p1}(k)$. A second component, or frequency-based phase tracking accelerator circuit 134, computes $A_{p2}(k)$.

In the delay-based phase tracking accelerator circuit 132 of FIG. 5, the input is coupled to the output of a phase error detector, i.e., e(k). The detected phase error e(k) is multiplied by the proportional control gain $G_p$ and then fed into (a+b+d−1) cascaded delay-add segments. The cascaded delay-add segments accumulate the phase variation during the combined delay period of the loop filter and the accelerator. The output of the last delay-add segment is the output of the delay-based phase tracking accelerator circuit, i.e., $A_{p1}(k)$.

In the frequency-based phase tracking accelerator circuit 134 of FIG. 5, the input is coupled to the estimated frequency offset at the output of the integral control path in the loop filter, i.e, f(k). It is fed into a multiplier and (b−2) cascaded delay-add segments. The multiplier scales the frequency offset estimate from the loop filter by a constant signal (a+d+1). The multiplier output is delayed and combined with the delayed output of the last delay-add segment $\Sigma_{n=2}^{b} f(k-n)$. The sum is then delayed and the delayed sum is the frequency-based phase tracking accelerator circuit, i.e., $A_{p2}(k)$. The output $A_p(k)$ of the direct-form phase tracking accelerator 130 is the sum of the outputs, i.e., $A_{p1}(k)$ and $A_{p2}(k)$, of the two phase tracking accelerator components, or circuits, 132 and 134.

Figure 6:
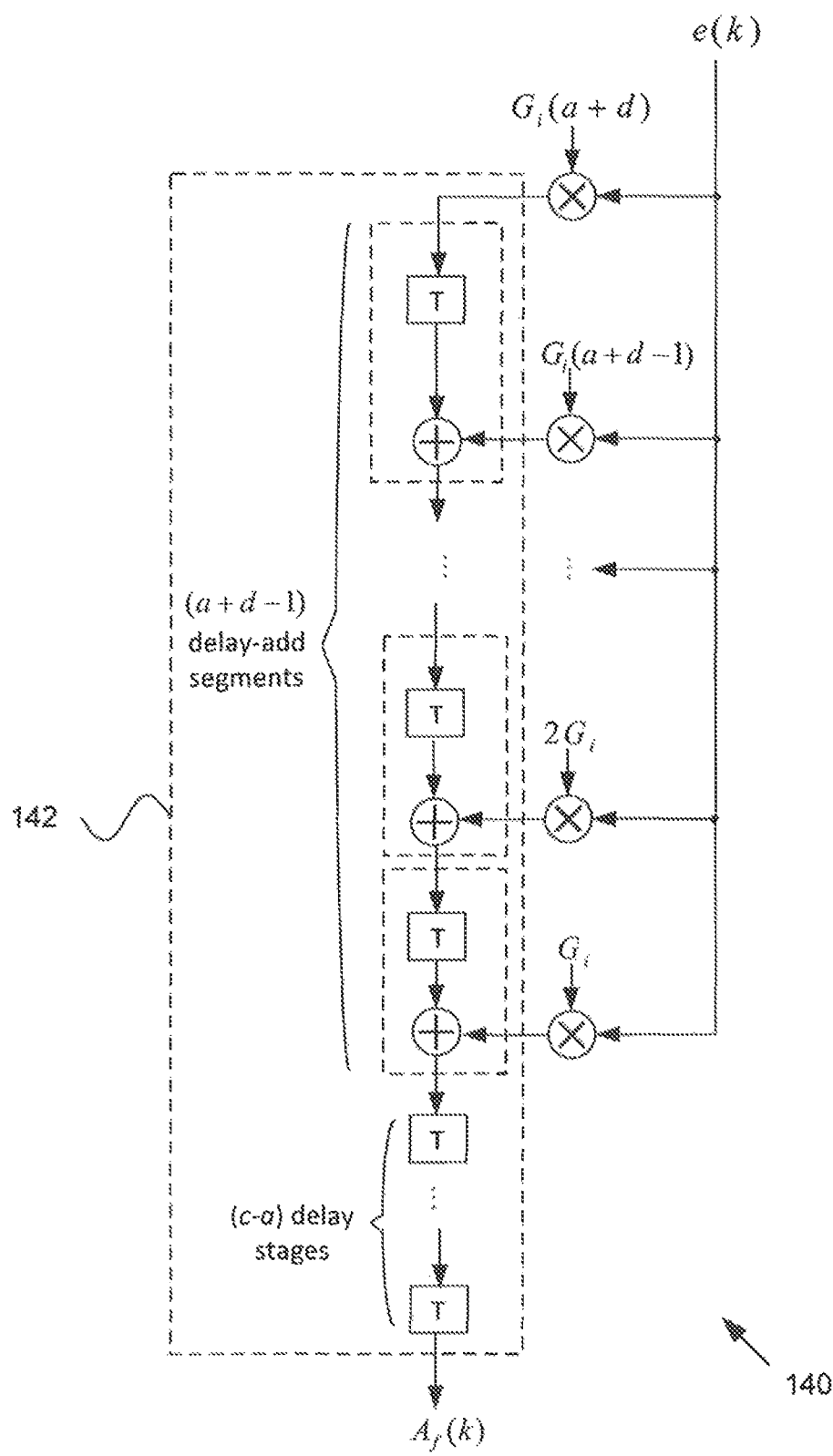
FIG. 6 illustrates a direct-form frequency tracking accelerator according to an embodiment of the present disclosure.

FIG. 6 illustrates an example embodiment of a direct-form frequency tracking accelerator 140. The frequency tracking accelerator 140 includes a frequency tracking accelerator circuit 142, which includes many similar elements when compared to the delay-based phase tracking accelerator circuit 132 of FIG. 5. The frequency tracking accelerator circuit 142 comprises (a+d−1) cascaded delay-add segments, (a+d) parallel multiplier branches, and (c−a) delay stages. The input of the direct-form frequency tracking accelerator 140 is coupled to the output of a phase error detector, i.e., e(k), which is fed into (a+d) parallel multipliers. In the m-th multiplier, for m=1, 2, . . . , a+d, the phase error is multiplied by $(a+d+1-m)G_1$, and then fed into (a+d−1) cascaded delay-add segments.

In the cascaded delay-add segments of the frequency tracking accelerator circuit 142, the first delay-add segment has a first input and a second input coupled to the outputs of the first and the second parallel multipliers, respectively. Each of the subsequent delay-add segments, i.e., m-th segment for 2≤m≤ (a+d−1), has a first input coupled to the output of the preceding delay-add segment and a second input coupled to the output of the (m+1)th multiplier. The output of the last delay-add segment is delayed by (c−a) units. The delayed signal is the frequency tracking accelerator output, i.e., $A_f(k)$.

An example embodiment of the direct-form phase accelerator in FIG. 6 is intended for applications where the required JTOL mask has steep rolling off rate or large dynamic range of frequency offset, e.g., CDR with spread-spectrum clocking support. In applications where the integral control gain is much less than the proportional gain, $(G_i \ll G_p)$, the frequency accelerator is optional.

Pre-Computation-Based Phase and Frequency Tracking Accelerators

A second embodiment of the present disclosure is a pre-computation-based phase and frequency tracking accelerator. This embodiment is intended to ease timing closure and simplify the implementation of the accelerator by pre-computing complex arithmetic operations in the accelerator such as multiplications.

The performance of timing recovery is insensitive to the quantization noise of the detected phase error e(k) due to loop filtering. The phase error is often quantized into N levels where N is usually a small number. For example, three signal levels correspond to lead, lag, and aligned phase relationships between the near-end sampling clock and the phase of the incoming signal. This enables the use of pre-computation to ease timing closure and simplify the implementation of the phase and frequency accelerators.

Pre-Computation-Based Phase Tracking Accelerator

Let $e_0, e_1, \ldots, e_{N-1}$, represent N possible values of the phase error signal e(k), the delay-based phase tracking accelerator circuit $A_{p1}(k)$ in Equation (16) can be rewritten as $$A_p(k) = \sum_{n=0}^{a+b+d-1} Q_s(k-n) \quad (19)$$

where $Q_s(k)$ is selected from N pre-computed values $Q_0, Q_1, \ldots, Q_{N-1}$, based on phase error signal e(k), i.e., $$Q_s(k) = \begin{cases} Q_0 = G_p e_0 & \text{if } e(k) = e_0 \\ Q_1 = G_p e_1 & \text{if } e(k) = e_1 \\ \vdots \\ Q_{N-1} = G_p e_{N-1} & \text{if } e(k) = e_{N-1} \end{cases} \quad (20)$$

Figure 7:
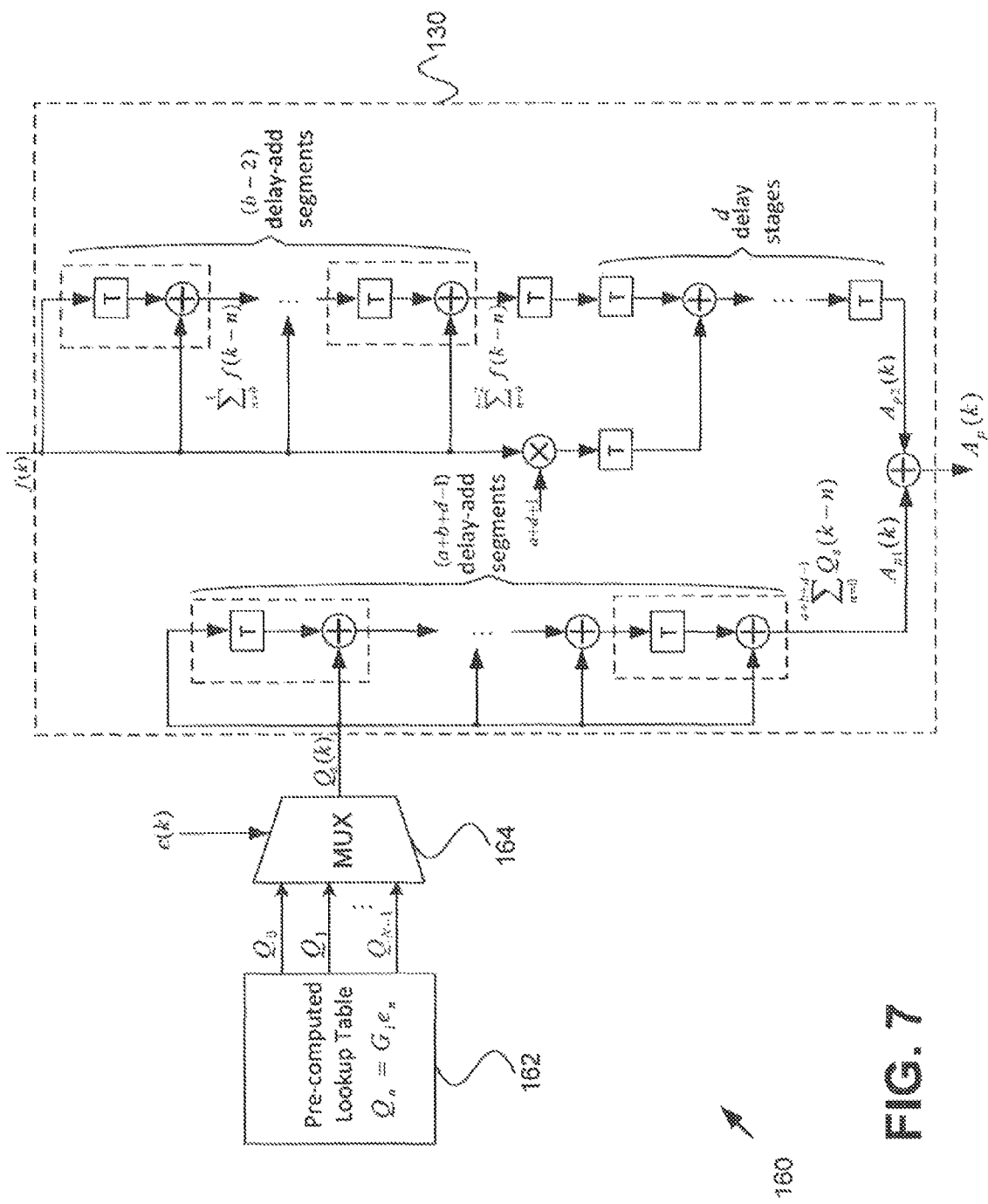
FIG. 7 illustrates a pre-computation-based phase tracking accelerator according to an embodiment of the present disclosure.

FIG. 7 illustrates an example embodiment of a pre-computation based phase accelerator 160. The pre-computation based phase accelerator 160 comprises the direct-form phase tracking accelerator 130 of FIG. 5, but with different inputs, in addition to a pre-computed lookup table (LUT) 162 and a multiplexer (MUX) 164. The direct-form phase tracking accelerator 130 comprises a first component, or delay-based phase tracking accelerator circuit, that computes the accumulated phase variations during the delay period, i.e., $A_{p1}(k)$, and a second component, or frequency-based phase tracking accelerator circuit, the second component being identical to the direct-form phase tracking accelerator $A_{p2}(k)$ as described in relation to FIG. 5.

In an example embodiment, the first component, or phase-based phase tracking accelerator circuit, of the pre-computation-based phase accelerator of FIG. 7 comprises the LUT 162 stored in memory or other media, and an N-to-1 MUX 164, in addition to the (a+b+d−1) cascaded delay-add segments in the embodiment of FIG. 5. In an example embodiment, the LUT 162 contains N pre-computed signals, i.e., $Q_0, Q_1, \ldots, Q_{N-1}$ as described in Equation 20. The MUX 164 selects signal $Q_s(k)$ from the pre-computed signals based on phase error signal e(k) at discrete time k. The selected signal $Q_s(k)$ is fed into the (a+b+d−1) cascaded delay-add segments to compute the sum of the most recent (a+b+d) samples of the selected signal $Q_s(k)$. The output of the last delay-add segment, i.e., $A_{p1}(k)$, is then combined with the output of the second component $A_{p2}(k)$ to form the pre-computation-based phase tracking acceleration output, i.e., $A_p(k)$.

Pre-Computation-Based Frequency Tracking Accelerator

Frequency tracking accelerator $A_f(k)$ in Equation (18) can be rewritten as $$A_f(k) = \sum_{m=0}^{a+d-1} F_m^s(k-n-c+a) \quad (21)$$

where $F_m^s(k)$, for m=1, 2, K, a+d, is selected from N pre-computed values $F_m^0, F_m^1, \ldots, F_m^{N-1}$, based on the input phase error signal e(k), i.e., $$F_m^s(k) = \begin{cases} F_m^0 = (a+d-m)G_i e_0 & \text{if } e(k) = e_0 \\ F_m^1 = (a+d-m)G_i e_1 & \text{if } e(k) = e_1 \\ \vdots \\ F_m^{N-1} = (a+d-m)G_i e_{N-1} & \text{if } e(k) = e_{N-1} \end{cases} \quad (22)$$

Figure 8:
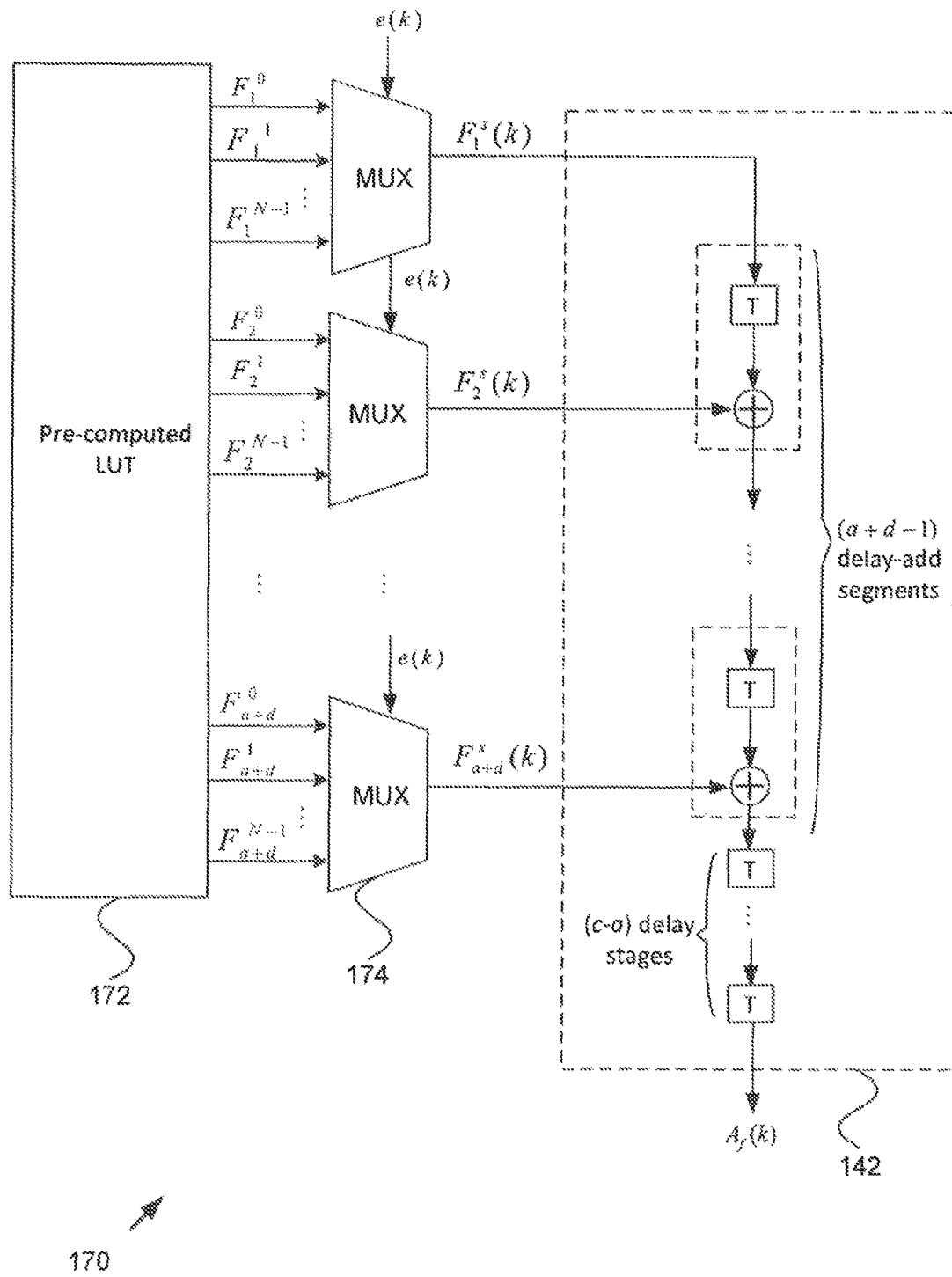
FIG. 8 illustrates a pre-computation based frequency tracking accelerator according to an embodiment of the present disclosure.

FIG. 8 illustrates an example embodiment of a pre-computation-based frequency tracking accelerator 170. The pre-computation-based accelerator 170 comprises the elements of the frequency tracking accelerator circuit 142 of FIG. 6, but with different inputs, in addition to a LUT 172 and an array of multiplexers 174 with (a+d) parallel N-to-1 MUXs. The frequency tracking accelerator circuit 142 comprises (a+d) cascaded delay-add segments. The LUT 172 comprises (a+d) by N entries, i.e., $F_m^n = (a+d+1-m)G_i e_n$, for n=0, 1, ..., N−1, and m=1, 2, ..., a+d. The m-th MUX, for m=1, 2, ..., a+d, in the MUX array 174 selects one output signal $F_m^s$ from N pre-computed outputs of the LUT 172, i.e., $F_m^0, F_m^1, \ldots, F_m^{N-1}$. The selected signals $F_1^s, F_2^s, \ldots, F_{a+d}^s$ are then fed into an accumulator which comprises (a+d−1) cascaded delay-add segments.

In the frequency tracking accelerator 142 of FIG. 8, the first and the second inputs of the first delay-add segment are coupled to the output of the first MUX output $F_1^s$ and the second MUX output $F_2^s$, respectively. Each of the subsequent delay-add segments, i.e., m-th segment for (m>1), has a first input coupled to the output of the preceding delay-add segment and a second input coupled to the output of the (m+1)th MUX output $F_{m+1}^s$. The output of the last delay-add segment is delayed by (c−a) clock cycles. The delayed signal is the output of the pre-computation-based frequency tracking accelerator, i.e., $A_f(k)$.

The functional detail of embodiments of the present disclosure is given using an example of synchronous timing recovery that incorporates a phase and frequency tracking accelerator for a communication link over an electrical wired channel. However, the applicability of the embodiments of the present disclosure can be extended to many other systems. A key target characteristic is a timing recovery loop with a digital loop filter.

In the following exemplary description of phase and frequency tracking accelerators, a common Gardner phase detector is used in which the detected phase error e(k) has three possible values, i.e., −1,0, and 1, corresponding to lead, lag, and aligned phase relationships between the near-end ADC sampling clock and the phase of the incoming signal.

Without loss of generality, the processing delay of the loop filter is assumed to be 4 clock cycles, i.e., a=b=c=2. The phase and frequency tracking accelerators have 1 clock cycle of delay, i.e., d=1. The recovered phase in Equation (14) can be rewritten as $$\phi(k) = \theta(k-1) + A_{p1}(k) + A_{p2}(k) + A_f(k) \quad (23)$$

where $$A_f(k) = G_i \sum_{n=0}^{2}(n+1)e(k-n) \quad (24)$$

is the frequency tracking accelerator 140, $$A_{p1}(k) = G_p \sum_{n=0}^{2} e(k-n) \quad (25)$$

and $$A_{p2}(k) = 4f(k-1) + f(k-2) \quad (26)$$

are the first and second components 132 and 134, respectively, of the phase tracking accelerator 130.

Figure 9:
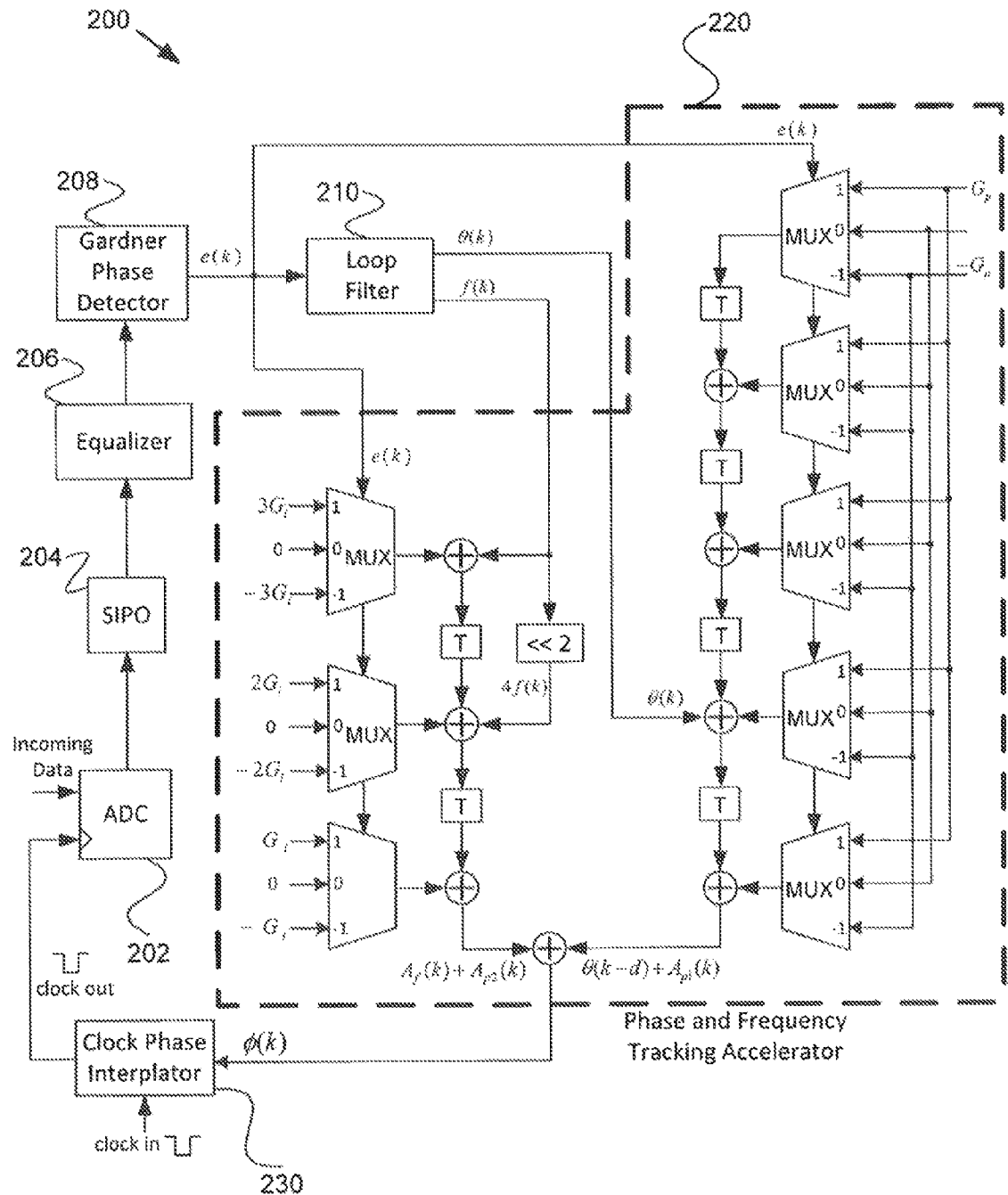
FIG. 9 illustrates a synchronous timing recovery loop including phase and frequency tracking accelerators according to an embodiment of the present disclosure.

FIG. 9 illustrates an example embodiment of a timing recovery loop 200 augmented by phase and frequency tracking accelerators 220. The embodiment comprises an ADC 202 for the sampling of incoming signals, serial-in-parallel-out blocks (SIPOs) 204 for parallel data processing, equalizers 206 for inter-symbol interference compensation, and a Gardner phase detector 208 for the detection of phase error between the sampling clock and the incoming signal at a near-end receiver. The timing recovery loop 200 further comprises a second-order loop filter 210, phase and frequency tracking accelerators 220 similar to the previously described phase and frequency tracking accelerator 120, and a clock phase interpolator 230 for the phase adjustment of the near-end ADC sampling clock.

In the example embodiment of FIG. 9, when compared with previously described embodiments, the estimated phase θ(k) from the phase computation block, the frequency tracking accelerator, and the phase tracking accelerator are combined by sharing common delay stages for simplification. The output φ(k) of the phase and frequency tracking accelerator 220 is the recovered phase of the incoming signal. It is used by the clock phase interpolator to adjust the phase of the ADC sampling clock so that it locks to the phase and frequency of the incoming signal.

An example embodiment of the present disclosure was implemented in a timing recovery/clock recovery block, and was found to reduce loop latency by 48 user intervals (UIs) and to improve jitter tolerance by 0.06-0.1 UI.

Another example embodiment of the present disclosure was implemented in a different timing recovery/clock recovery block, and was found to increase loop bandwidth and solve the problem of XFI jitter tolerance mask violation at 8 MHz. In addition, it reduced loop latency by 48 UIs and improved JTOL by 0.06-0.1 UI.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A timing recovery circuit for use in a timing recovery loop, comprising:
   a loop filter,
   a frequency tracking accelerator configured to compute a phase estimate error due to frequency tracking delay; and
   a phase tracking accelerator configured to compute phase variations based on a combined delay period of the loop filter, the frequency tracking accelerator, and the phase tracking accelerator,
   the timing recovery circuit being configured to compute a recovered phase using outputs of the frequency tracking accelerator and the phase tracking accelerator.

2. The timing recovery circuit of claim 1 wherein the phase tracking accelerator comprises:
   a delay-based phase tracking accelerator circuit configured to compute accumulated phase variations $A_{p1}(k)$ during a combined delay period of the loop filter, the frequency tracking accelerator, and the phase tracking accelerator, and
   a frequency-based phase tracking accelerator circuit configured to compute accumulated phase variations $A_{p2}(k)$ based on an estimated frequency offset during the combined delay period of a phase computation block of the loop filter, the frequency tracking accelerator, and the phase tracking accelerator.

3. The timing recovery circuit of claim 2 wherein the loop filter further comprises a phase error detector and an integral control path, and wherein:
   an input of the delay-based phase tracking accelerator circuit is coupled to an output e(k) of the phase error detector;
   an input of the frequency-based phase tracking accelerator circuit is coupled to the output f(k) of the integral control path of the loop filter; and
   an input of the frequency tracking accelerator is coupled to the output e(k) of the phase error detector.

4. The timing recovery circuit of claim 3 further comprising:
   a first adder having a first input coupled to an output of the delay-based phase tracking accelerator circuit to receive the accumulated phase variations $A_{p1}(k)$ and a second input coupled to an output of the frequency-based phase tracking accelerator circuit to receive the accumulated phase variations $A_{p2}(k)$, configured to compute the combined output $A_p(k)$ of the phase tracking accelerator,
   a plurality d of delay stages configured to delay an estimated phase θ(k) at the output of the phase computation block, where d represents the number of additional delay stages in the phase and frequency tracking accelerators, and
   a second adder configured to compute the recovered phase for timing recovery,
   wherein a first input of the second adder is coupled to the delayed phase estimate θ(k−d), a second input of the second adder is coupled to the combined output of the phase tracking accelerator $A_p(k)$, and a third input of the second adder is coupled to the output of the frequency tracking accelerator $A_f(k)$.

5. The timing recovery circuit of claim 4 wherein the loop filter comprises a proportional control path, and wherein the delay-based phase tracking accelerator circuit further comprises a first multiplier having a first input coupled to the output e(k) of the phase error detector and having a second input coupled to a proportional control gain $G_p$ of the proportional control path in the loop filter.

6. The timing recovery circuit of claim 4 wherein the delay-based phase tracking accelerator circuit comprises a plurality (a+b+d−1) of cascaded delay-add segments, wherein a is a number of pipeline delay stages in a proportional control path of the loop filter, b is a number of pipeline delay stages in a phase computation block of the loop filter, and d is a cumulative number of additional pipeline delay stages in the phase tracking accelerator and the frequency tracking accelerator.

7. The timing recovery circuit of claim 6 wherein each of the plurality (a+b+d−1) of cascaded delay-add segments has a first input being delayed and then summed with a second input.

8. The timing recovery circuit of claim 6 wherein the plurality of cascaded delay-add segments comprises:
   a first delay-add segment having both a first input and a second input coupled to an output of a first multiplier, and
   subsequent delay-add segments having a first input coupled to an output of a preceding delay-add segment and a second input coupled to the output of the first multiplier.

9. The timing recovery circuit of claim 4 wherein the frequency-based phase tracking accelerator circuit comprises a plurality (b−2) of cascaded delay-add segments.

10. The timing recovery circuit of claim 9 wherein each of the plurality (b−2) of cascaded delay-add segments has a first input being delayed and then summed with a second input.

11. The timing recovery circuit of claim 10 wherein the plurality (b−2) of cascaded delay-add segments comprises:
   a first delay-add segment having both a first input and a second input coupled to the output f(k) of the loop filter integral control path; and
   subsequent delay-add segments having a first input coupled to an output of a preceding delay-add segment and a second input coupled to the output f(k) of the loop filter integral control path.

12. The timing recovery circuit of claim 9 wherein the frequency-based phase tracking accelerator circuit comprises a second multiplier having a first input coupled to the output f(k) of the loop filter integral control path and a second input coupled to a constant signal (a+d+1), wherein a is a number of pipeline delay stages in a proportional control path of the loop filter and d is the a number of additional pipeline delay stages in the phase and frequency tracking accelerator.

13. The timing recovery circuit of claim 12 wherein the frequency-based phase tracking accelerator circuit comprises a third adder having a first input coupled to a delayed signal output by the second multiplier output, and a second input coupled to a delayed signal output by the last delay-add segment of the plurality (b−2) of cascaded delay-add segments.

14. The timing recovery circuit of claim 13 wherein the frequency-based phase tracking accelerator circuit comprises (d−1) delay stages having an input coupled to the output of the third adder to compute the accumulated phase variations $A_{p2}(k)$ of the frequency-based phase tracking accelerator circuit.

15. The timing recovery circuit of claim 9 wherein the phase tracking accelerator comprises a fourth adder having a first input coupled to an output of the last delay-add segment of the plurality (b−2) of cascaded delay-add segments, and having a second input coupled to the output of the frequency-based phase tracking accelerator circuit to compute the combined output $A_p(k)$ of the phase tracking accelerator.

16. The timing recovery circuit of claim 4 wherein the frequency tracking accelerator comprises (a+d) parallel multipliers, (a+d−1) cascaded delay-add segments, and (c−a) delay stages where c is a number of pipeline delay stages in the integral control path of the loop filter.

17. The timing recovery circuit of claim 16 wherein an m-th multiplier in the (a+d) parallel multipliers in the frequency tracking accelerator has a first input coupled to the output e(k) of the phase error detector, and has a second input coupled to a constant signal $(a+d+1-m)G_i$, for m=1, 2, . . . , a+d, wherein $G_i$ is integral control gain.

18. The timing recovery circuit of claim 16 wherein:
   an m-th multiplier in the (a+d) parallel multipliers in the frequency tracking accelerator has a first input coupled to the output e(k) of the phase error detector, and has a second input coupled to a constant signal $(a+d+1-m)G_i$, for m=1, 2, . . . , a+d, wherein $G_i$ is integral control gain; and
   the plurality (a+d−1) of cascaded delay-add segments in the frequency tracking accelerator comprises a first segment and an m-th segment,
   the first segment having a first input and a second input coupled to the output of the first multiplier and the output of the second multiplier, respectively;
   the m-th segment has a first input coupled to the output the preceding delay-add segment and a second input coupled to the output of the (m+1)th multiplier; and
   wherein the frequency tracking accelerator comprises (c−a) delay stages having an input coupled to the output of the last segment of the (a+d−1) cascaded delay-add segments.

19. The timing recovery circuit of claim 1 further comprising:
   a first pre-computed lookup table (LUT) stored in a computer readable medium for phase tracking acceleration, the pre-computed LUT having N outputs, where N represents the number of possible values of a detected phase error e(k); and
   a first pre-computation multiplexer (MUX) in communication with the pre-computed LUT to receive the N outputs of the pre-computed LUT as inputs to the pre-computation MUX, an output of the pre-computation MUX being provided as an input to the phase tracking accelerator.

20. The timing recovery circuit of claim 3 further comprising:
   a first pre-computed lookup table (LUT) stored in a computer readable medium for phase tracking acceleration, the first pre-computed LUT having N outputs, where N represents the number of possible values of the detected phase error e(k); and
   a first pre-computation multiplexer (MUX) in communication with the first pre-computed LUT and configured to receive the N outputs of the first pre-computed LUT as inputs to the first pre-computation MUX, the output of the first pre-computation MUX being provided as an input to the phase tracking accelerator, and wherein
   a second input of the phase tracking accelerator circuit is coupled to the output f(k) of the integral control path of the loop filter.

21. The timing recovery circuit of claim 20 wherein an nth pre-computed value in the first pre-computed LUT for the phase tracking accelerator is $Q_n = G_p e_n$ for n=0, 1, . . . , N−1, where $e_n$ is the nth possible value of phase error, e(k).

22. The timing recovery circuit of claim 20 wherein the first pre-computation MUX comprises a N-to-1 MUX having a MUX selection signal coupled to the phase error e(k) at the phase error detector output, and N inputs coupled to the N outputs from the first pre-computed LUT to select one pre-computed signal $Q_s$.

23. The timing recovery circuit of claim 22 wherein the delay-based phase tracking accelerator comprises a plurality (a+b+d−1) of cascaded delay-add segments, wherein a is a number of pipeline delay stages in a proportional control path of the loop filter, b is a number of pipeline delay stages in a phase computation block of the loop filter, and d is a cumulative number of additional pipeline delay stages in the phase tracking accelerator and the frequency tracking accelerator.

24. The timing recovery circuit of claim 23 wherein each of the plurality (a+b+d−1) of cascaded delay-add segments has a first input being delayed and then summed with a second input.

25. The timing recovery circuit of claim 23 wherein the plurality of cascaded delay-add segments comprises:
 a first delay-add segment having both a first input and a second input coupled to the output of the first pre-computation MUX; and
 second and subsequent delay-add segments having a first input coupled to the output of the preceding delay-add segment and a second input coupled to the output of the first pre-computation MUX.

26. The timing recovery circuit of claim 25 wherein the phase tracking accelerator comprises an adder having a first input coupled to the output of the last delay-add segment $A_{p1}(k)$ and a second input coupled to the output of the frequency-based phase tracking accelerator $A_{p2}(k)$ to compute a pre-computation-based phase tracking accelerator output $A_p(k)$.

27. The timing recovery circuit of claim 1 further comprising:
 a second pre-computed lookup table (LUT) stored in a computer readable medium for frequency tracking acceleration; and
 an array of second pre-computation multiplexers (MUXs) in communication with the second pre-computed LUT to receive the outputs of the second pre-computed LUT as inputs to the second pre-computation MUXs, the output of each of the second pre-computation MUXs being provided as inputs to delay-add segments in the frequency tracking accelerator;
 wherein the second pre-computed LUT has (a+d) by N pre-computed outputs $F_1^0, F_1^1 \ldots, F_1^{N-1}, F_2^0, F_2^1 \ldots, F_2^{N-1}, \ldots, F_{a+d}^0, F_{a+d}^1 \ldots, F_{a+d}^{N-1}$ stored in the computer readable medium for the acceleration of frequency tracking.

28. The timing recovery circuit of claim 27 wherein:
 the second pre-computed LUT has (a+d) by N outputs, where N represents the number of possible values of the detected phase error e(k), a is a number of pipeline delay stages in the a proportional control path of the loop filter, and d is the a number of additional pipeline delay stages in the phase and frequency tracking accelerator; and
 the array of second pre-computation MUXs comprises (a+d) second pre-computation MUXs to receive the (a+d) by N outputs of the second pre-computed LUT as inputs to the pre-computation MUXs such that each of the second pre-computation multiplexers has N inputs.

29. The timing recovery circuit of claim 27 wherein the second pre-computed LUT comprises (a+d) by N entries, resulting in $F_m^n = (a+d-m)G_i e_n$, for $n=0, 1, \ldots, N-1$, and $m=1, 2, \ldots, a+d$, wherein $G_i$ is integral control gain.

30. The timing recovery circuit of claim 27 wherein the frequency tracking accelerator comprises (a+d) parallel N-to-1 MUXs, and wherein a selection signal of each MUX is coupled to the phase error e(k) from the phase error detector.

31. The timing recovery circuit of claim 30 wherein the inputs of the m-th MUX of the frequency tracking accelerator select one output signal $F_m^s$ from N outputs $F_m^0, F_m^1, \ldots, F_m^{N-1}$ of the second pre-computed LUT.

32. The timing recovery circuit of claim 27 wherein the frequency tracking accelerator comprises (a+d−1) cascaded delay-add segments and (c−a) delay stages.

33. The timing recovery circuit of claim 27 wherein the first segment of (a+d−1) cascaded delay-add segments in the frequency tracking accelerator has a first input coupled to the output of the first MUX output $F_1^s$ and a second input coupled to the output of the second MUX output $F_2^s$.

34. The timing recovery circuit of claim 27 wherein the m-th segment, for $m=2, 3, \ldots, a+d$, of the (a+d−1) cascaded delay-add segments in the frequency tracking accelerator has the first input coupled to the output of the preceding delay-add segment and a second input coupled to the output of the (m+1)th MUX output $F_{m+1}^s$.

35. The timing recovery circuit of claim 32 wherein the frequency tracking accelerator comprises (c−a) delay stages having the input of the first delay stage coupled to the output of the last segment of the (a+d−1) cascaded delay-add segments.

36. A timing recovery method for a timing recovery loop, comprising:
 computing a phase estimate error due to frequency tracking delay,
 computing accumulated delay-based phase variations based on a combined delay period of a loop filter, a frequency tracking accelerator, and a phase tracking accelerator,
 computing accumulated frequency-based phase variations based on an estimated frequency offset in a combined delay period of the loop filter, the frequency tracking accelerator, and the phase tracking accelerators, and
 computing a recovered phase based on the computed phase estimate error, the accumulated delay-based phase variations, and the accumulated frequency-based phase variations.

37. The method of claim 36 further comprising:
 providing a first pre-computed look-up table (LUT) for acceleration of phase tracking;
 providing a pre-computation-based phase tracking accelerator to accelerate the tracking of phase variation during a loop delay period of the timing recovery loop;
 providing a second pre-computed look-up table (LUT) for acceleration of frequency tracking; and
 providing a pre-computation-based frequency tracking accelerator to accelerate the tracking of frequency variation during the loop delay period of the timing recovery loop.

* * * * *

UNITED STATES PATENT AND TRADEMARK OFFICE
CERTIFICATE OF CORRECTION

| | | |
|---|---|---|
| PATENT NO. | : 8,670,512 B1 | |
| APPLICATION NO. | : 13/540962 | |
| DATED | : March 11, 2014 | |
| INVENTOR(S) | : Nanyan Wang | |

It is certified that error appears in the above-identified patent and that said Letters Patent is hereby corrected as shown below:

In the Claims

Column 17, line 45, claim 28, delete "is the a" and insert therefor --is a--;

Column 17, line 57, claim 28, delete "in the a" and insert therefor --is a--.

Signed and Sealed this
Twenty-seventh Day of May, 2014

Michelle K. Lee
*Deputy Director of the United States Patent and Trademark Office*